(12) United States Patent
Despesse et al.

(10) Patent No.: US 11,909,005 B2
(45) Date of Patent: Feb. 20, 2024

(54) POWER SUPPLY SYSTEM

(71) Applicant: Commissariat à l'Energie Atomique et aux Energies Alternatives, Paris (FR)

(72) Inventors: Ghislain Despesse, Grenoble (FR); Sylvain Bacquet, Grenoble (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 131 days.

(21) Appl. No.: 17/455,783

(22) Filed: Nov. 19, 2021

(65) Prior Publication Data

US 2022/0166073 A1 May 26, 2022

(30) Foreign Application Priority Data

Nov. 23, 2020 (FR) ..................................... 20 11988

(51) Int. Cl.
*H01M 10/42* (2006.01)
*H01M 10/48* (2006.01)

(52) U.S. Cl.
CPC ..... *H01M 10/4207* (2013.01); *H01M 10/425* (2013.01); *H01M 10/482* (2013.01); *H01M 2010/4271* (2013.01); *H01M 2220/20* (2013.01)

(58) Field of Classification Search
CPC ........ B60L 3/0046; B60L 58/13; B60L 58/18; H01M 10/4207; H01M 10/425;
(Continued)

(56) References Cited

U.S. PATENT DOCUMENTS 6,741,065 B1 5/2004 Ishii et al.
9,493,090 B2 11/2016 Timmons et al.
(Continued)

FOREIGN PATENT DOCUMENTS

EP 1 223 653 A1 7/2002
EP 2 255 990 A1 12/2010
(Continued)

OTHER PUBLICATIONS

Machine translation WO2012117111A1 (Year: 2012).*
(Continued)

*Primary Examiner* — Victoria H Lynch
(74) *Attorney, Agent, or Firm* — Oblon, McClelland, Maier & Neustadt, L.L.P.

(57) ABSTRACT

The invention relates to an electrical power-supply system comprising:
a plurality of electrical batteries (B_1, B_2, B_3, B_aux), each battery comprising a plurality of cells connected in series and/or parallel and separate switching means attached to each cell or to a group of a plurality of cells, said plurality of batteries comprising batteries that are called main batteries (B_1, B_2, B_3), which are each dedicated to delivering electrical power to one separate piece of consuming equipment,
processing and control means,
the processing and control means comprising:
means for selecting at least one what is called standby battery (B_S) from said plurality of batteries, the selected standby battery being a battery the output current of which is zero.

14 Claims, 7 Drawing Sheets

(58) Field of Classification Search
CPC .... H01M 10/44; H01M 10/46; H01M 10/482; H01M 2010/4271; H01M 2220/20; H01M 50/204; H01M 50/249; H01M 50/298; H02J 1/106; H02J 2310/48; H02J 7/0013; H02J 7/342; Y02E 60/10; Y02T 10/70
See application file for complete search history.

(56) References Cited

U.S. PATENT DOCUMENTS

| | | |
|---|---|---|
| 2011/0187184 A1 | 8/2011 | Ichikawa |
| 2014/0287278 A1 | 9/2014 | Despesse |
| 2016/0046200 A1 | 2/2016 | Timmons et al. |
| 2018/0009400 A1 | 1/2018 | Lee et al. |
| 2019/0294173 A1 | 9/2019 | Szubbocsev |
| 2021/0018924 A1 | 1/2021 | Szubbocsev |

FOREIGN PATENT DOCUMENTS

| | | |
|---|---|---|
| KR | 10-2174990 B1 | 11/2020 |
| WO | WO 2012/117111 A1 | 9/2012 |
| WO | WO 2013/007810 A1 | 1/2013 |

OTHER PUBLICATIONS

French Preliminary Search Report dated Aug. 19, 2021 in French Application 20 11988 filed on Nov. 23, 2020, 10 pages (with English Translation of Categories of Cited Documents & Written Opinion).

\* cited by examiner

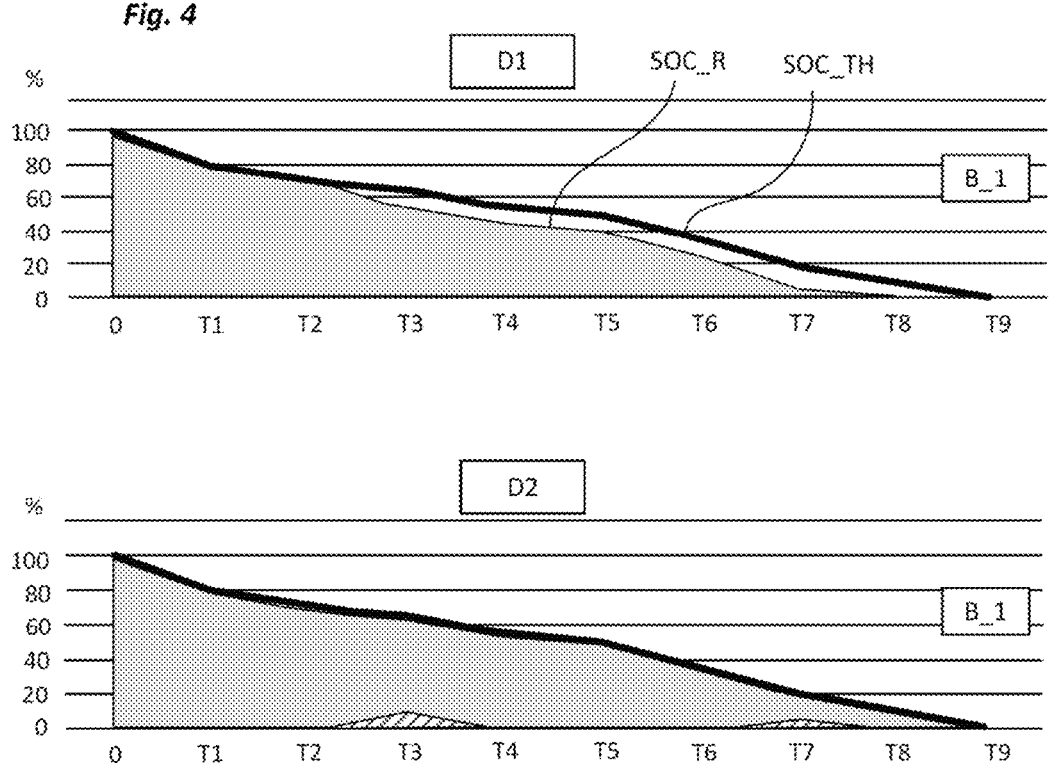

POWER SUPPLY SYSTEM

TECHNICAL FIELD OF THE INVENTION

The present invention relates to an electrical power-supply system comprising a plurality of batteries and means for managing these batteries with a view to supplying power to a plurality of pieces of consuming equipment.

PRIOR ART

To supply power to a plurality of electric motors of a given apparatus, a hybrid or electric vehicle for example, it is known to use a battery pack that comprises a plurality of batteries connected in parallel. In a hybrid or electric vehicle, the battery pack is intended to deliver electrical power to the traction motor, but also to the motor intended for the air conditioning, to the motor dedicated to the power steering, and to the auxiliary 12 V or 24 V battery intended to be used to supply power to the electricals of the vehicle. The battery pack is connected to a DC bus, and DC/AC converters (one 20 for each motor) and a DC/DC converter (for the auxiliary battery) are connected to this bus with a view to delivering the desired voltage to each piece of consuming equipment. This solution thus allows motors having different operating frequencies and amplitudes to be supplied with power.

Recently, it has been proposed to avoid the use of these converters, in order to make savings with respect to weight, bulk and cost. To do this, each battery of the pack may be produced with what is called a switched-cell architecture. This solution allows each converter to be replaced. In this architecture, each cell may be controlled individually. A plurality of cells connected in series and/or parallel may form a module. Specifically, each cell of a battery may be switched between an active state and an inactive state by virtue of suitable switching means connected in series and parallel with the cell. A control system is then tasked with controlling the switching means in order to make the voltage delivered by each battery in its entirety vary. This type of architecture is well-known and notably described in patent applications No. WO2013/007810A1, WO2012/117111A1, WO2012/117110A2, WO2012/117/109A1 and U.S. Pat. No. 9,493,090B2.

Patent application US2018/009400A1 describes another architecture comprising two batteries and having a plurality of operating configurations.

Use of switched-cell technology moreover allows:
a voltage of shape tailored to the load (voltage, frequency, waveform, etc.) to be produced;
the battery life of the system to be improved;
the availability of the system to be improved.

With this new switched-cell architecture, each battery of the battery pack may be dedicated to supplying power to one separate electric motor; the batteries thus no longer supply all together the electric motors via one DC bus and suitable converters. This requires each battery to be correctly dimensioned to the piece of consuming equipment to which it is supposed to supply power. This dimensioning is however complex because the battery must not have too large a capacity, in order to limit weight and bulk, or too low a capacity, in order to avoid running out of charge.

The aim of the invention is to provide an electrical power-supply system that comprises a plurality of batteries, advantageously switched-cell batteries, each associated with one separate piece of consuming equipment, this system allowing the delivery of electrical power to the pieces of consuming equipment to be guaranteed, without over-dimensioning the batteries thereof.

DISCLOSURE OF THE INVENTION

This aim is achieved via an electrical power-supply system comprising:
a plurality of electrical batteries, each battery comprising a plurality of cells connected in series and/or parallel and separate switching means attached to each cell or to a group of a plurality of cells, said plurality of batteries comprising batteries that are called main batteries, which are each dedicated to delivering electrical power to one separate piece of consuming equipment,
processing and control means,
The processing and control means comprising:
means for selecting at least one what is called standby battery from said plurality of batteries, the selected standby battery being a battery the output current of which is zero;
means for determining an operating configuration from at least two operating configurations:
a first configuration in which the selected standby battery is used to provide assistance to one of the main batteries;
a second configuration in which the selected standby battery is used to charge at least one main battery;
control means suitable for achieving a connection configuration of the selected standby battery to the main battery depending on the determined operating configuration,
and, applied to each main battery, the processing and control means also comprise:
a first module for acquiring the actual state of charge of each main battery,
a module for determining a difference between the acquired actual state of charge and a theoretical state of charge and/or a slope of variation in the actual state of charge,
a first module for carrying out comparison of said difference with a first threshold difference and/or of the slope of variation with a first threshold slope, and
a first control module that is activated when the determined difference exceeds said first threshold difference and/or when the determined slope exceeds said first threshold slope, and that is configured to activate a provision of assistance to the main battery using the secondary battery while keeping the main battery connected to its piece of consuming equipment.

According to one particularity, the processing and control means are configured to implement a processing mode chosen from said following processing modes:
a first processing mode in which, during its use, the actual state of charge of each main battery is kept at a theoretical state of charge that is determined depending on the life cycle thereof;
a second processing mode in which the state of charge of each main battery is kept above a threshold value;
a third processing mode in which the processing and control means are configured to monitor the power level required by each piece of consuming equipment with respect to a threshold power level.

According to another particularity, the system comprises first switching means comprising a plurality of switches arranged to control the connection or disconnection of each main battery to/from the piece of consuming equipment with which it is associated.

According to another particularity, the system comprises second switching means comprising a plurality of switches arranged to control the connection or disconnection of each main battery to/from each other main battery.

According to another particularity, the system comprises third switching means that are controllable by the processing and control means and that are arranged to control the connection or disconnection of each battery to/from an electrical power grid.

According to another particularity, said plurality of batteries comprise one battery, called the auxiliary battery, that is not associated with a piece of consuming equipment.

According to another particularity, the system comprises fourth switching means that are controllable by the processing and control means and that are arranged to control the connection or disconnection of the auxiliary battery to/from each main battery.

According to another particularity, applied to each main battery, the processing and control means comprise:
- a second module for carrying out comparison of said difference with a second threshold difference higher than the first threshold difference, and/or of the slope of variation with a second threshold slope higher than the first threshold slope, and
- a second control module that is activated when the determined difference exceeds said second threshold difference and/or when the determined slope exceeds said second threshold slope, and that is configured to activate a disconnection of the main battery from its piece of consuming equipment and a connection, with a view to recharging, of said main battery to the secondary battery or to an electrical grid.

According to another particularity, applied to each main battery, the processing and control means comprise:
- a second module for acquiring the electrical power delivered by each main battery to its piece of consuming equipment,
- a third module for carrying out comparison of the power delivered by each battery with a threshold value,
- a third control module that is activated when said power delivered by a main battery exceeds said threshold value, and that is configured to activate a provision of assistance to the main battery using the standby battery.

According to another particularity, said plurality of batteries each comprise a plurality of cells connected in series and/or parallel, each cell comprising switching means.

The invention also relates to a control method implemented in an electrical power-supply system such as defined above, said method comprising the following steps:
- acquiring the actual state of charge of each main battery,
- determining a difference between the actual state of charge and a theoretical state of charge and/or a slope of variation in the actual state of charge,
- carrying out a first comparison of said difference with a first threshold difference and/or of the slope of variation with a first threshold slope, and
- when the determined difference exceeds said first threshold difference and/or when the determined slope exceeds said first threshold slope, generating a command to carry out a recharge of the main battery using the standby battery while keeping the main battery connected to its piece of consuming equipment.

According to one particularity, the method also comprises the following steps:
- carrying out a second comparison of said difference with a second threshold difference higher than the first threshold difference, and/or of the slope of variation with a second threshold slope higher than the first threshold slope, and
- when the determined difference exceeds said second threshold difference and/or when the determined slope exceeds said second threshold slope, generating a command to carry out disconnection of the main battery from its piece of consuming equipment and a connection, with a view to recharging, of said main battery to the standby battery or to an electrical grid.

According to another particularity, the method comprises the following steps:
- acquiring the electrical power delivered by each main battery to its piece of consuming equipment,
- carrying out comparison of the power delivered by each battery with a threshold value,
- when said power delivered by a main battery exceeds said threshold value, activating a provision of assistance to the main battery using the standby battery.

The invention also relates to use of the electrical power-supply system such as defined above, to supply power to electric motors located on-board a hybrid or electric vehicle.

BRIEF DESCRIPTION OF THE FIGURES

Other features and advantages will become apparent from the following detailed description, which is given with reference to the appended figures listed below:

FIG. 4 and FIG. 5 show a number of graphs illustrating the operating principle of the electrical power-supply system of the invention;

DETAILED DESCRIPTION OF AT LEAST ONE EMBODIMENT

In the rest of the description, the term DC means "direct current" and the term AC means "alternating current". Thus, AC voltage will be spoken of when reference is being made to an alternating voltage, and DC voltage will be spoken of when reference is being made to a constant voltage.

The invention relates to an electrical power-supply system that is notably perfectly suitable for being installed in a hybrid or electric vehicle. It is then located on-board the vehicle and participates in the traction of the vehicle and in the supply of power to various pieces of consuming equipment of the vehicle.

The electrical power-supply system comprises a battery pack.

In the context of the invention, the battery pack comprises a plurality of batteries, called main batteries $B\_1$, $B\_2$, $B\_3$.

Each main battery may comprise one or more modules, each module comprising a plurality of cells for storing electrical energy.

By cell, what is meant is one elementary cell or a group of elementary cells placed in series and/or in parallel. By elementary cell, it may be a question of a storage element (battery cell, electrical capacitor, micro-battery, assembly of a plurality of storage technologies), of a generator (fuel-cell stack, zinc-air stack, photovoltaic cell) or of a combination of both (generator associated with a buffer storage element).

Figure 7:
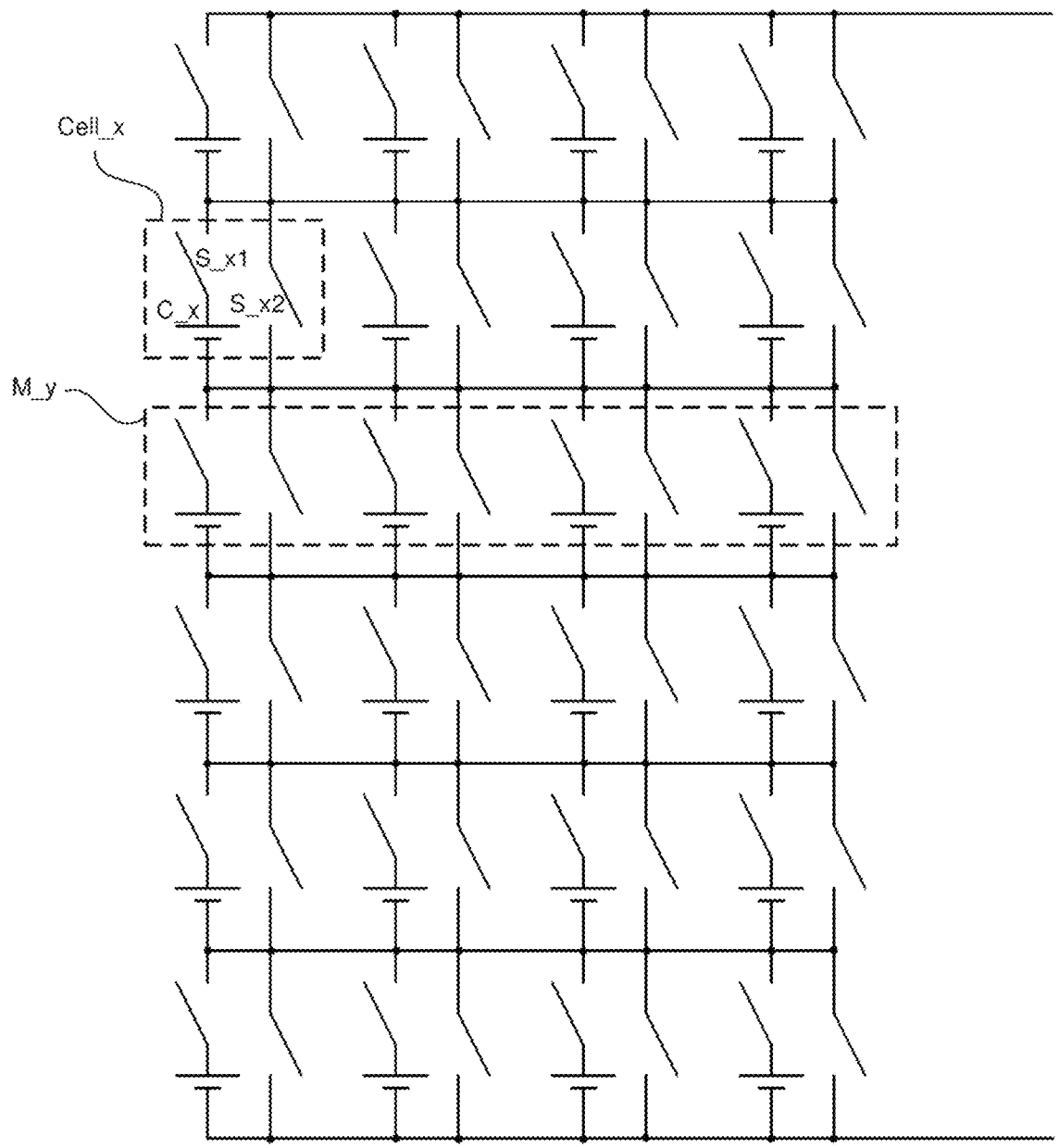
FIG. 7 shows the schematic of a switched-cell battery.

Advantageously, each main battery B_1, B_2, B_3 of the pack is produced with what is called a switched-cell architecture. This solution allows the DC/AC converter at the output of the battery pack to be replaced. In this architecture, as illustrated in FIG. 7, each cell Cell_x of the battery B may be controlled individually. A plurality of cells connected in series and/or parallel may form a module M_y. Specifically, each cell of the battery pack may be switched between an active state and an inactive state by virtue of suitable switching means S_x1, S_x2 connected in series and parallel with its capacitor C_x. A control system is then tasked with controlling the switching means in order to make the voltage delivered by each battery in its entirety vary. This type of architecture is well-known and notably described in patent documents No. WO2013/007810A1, WO2012/117111A1, WO2012/117110A2, WO2012/117/109A1 and U.S. Pat. No. 9,493,090B2 already mentioned above.

Each main battery B_1, B_2, B_3 of the pack is said to be in an active state when it is operating and delivering a current intended to power a particular piece of consuming equipment (see below) that is associated therewith.

A main battery is said to be in a secondary state when it is inactive and its output current is zero. In other words, it is not supplying power to the piece of consuming equipment with which it is associated.

The invention is described below with respect to a plurality of separate batteries, of a given battery pack for example, but it must be understood that the invention may be applied to a plurality of separate battery packs, each battery pack being dedicated to supplying power to a separate piece of consuming equipment and thus comprising one or more batteries.

Figure 1:
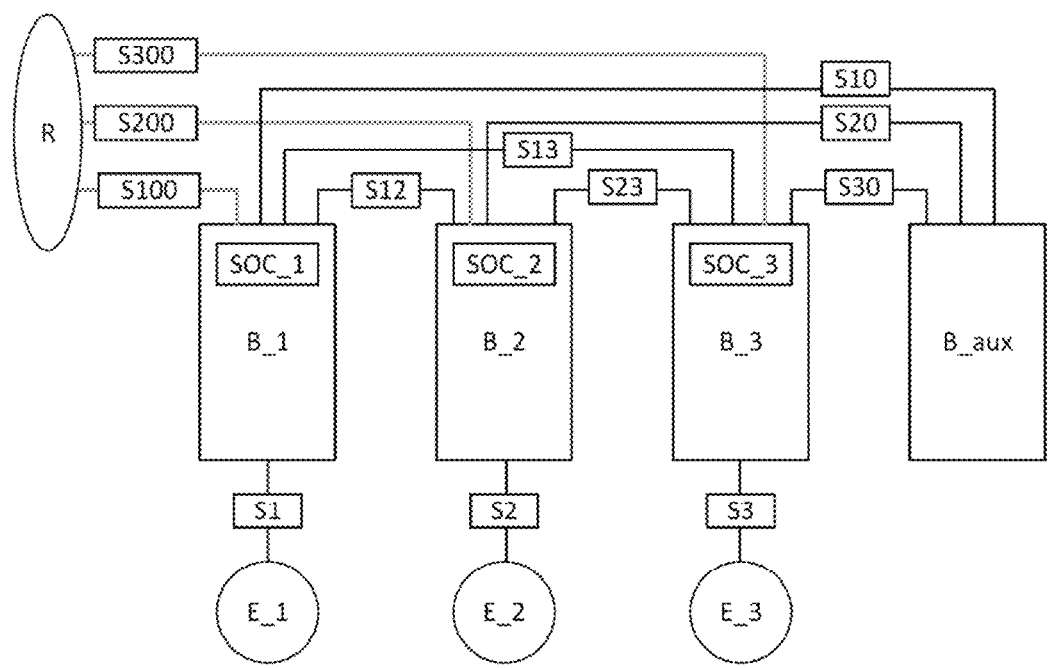
FIG. 1 schematically shows the electrical power-supply system according to the invention.

In FIG. 1, the system is shown with three main batteries B_1, B_2, B_3 each connected to one separate piece of consuming equipment E_1, E_2, E_3.

In the context of the invention, each main battery B_1, B_2, B_3 is intended to deliver electrical power to its separate piece of consuming equipment E_1, E_2, E_3, for example an electric motor. Each main battery B_1, B_2, B_3 may be connected to its piece of consuming equipment directly, via a single-phase or three-phase architecture.

By piece of consuming equipment, what must be understood is a supply line via which one or more devices that operate under the same voltage (same amplitude, same frequency, same phase) may be supplied with power. The number of batteries employed is essentially defined by the number of different voltages that it is necessary to deliver. For example, to supply variable speed motors that operate with different frequencies and/or voltages with power, as many batteries as motors are required. In contrast, certain pieces of equipment that operate under a common voltage, such as 230 V-50 Hz, or 48 VDC, may share the same supply line. The invention thus relates to the cases where it is necessary to deliver power to at least two different supply lines. By way of example, FIG. 1 shows three separate pieces of consuming equipment E_1, E_2, E_3, each associated with one separate battery B_1, B_2, B_3.

The system may also comprise a battery B_aux, called the auxiliary battery, that is associated with no piece of consuming equipment, the role of this battery merely being to be connected to at least one main battery of the pack, with a view to providing assistance to this main battery, through supply of power to its piece of electrical equipment and/or exchange of energy with this main battery. This auxiliary battery B_aux has a switched-cell electrical architecture that is identical to that of the main batteries and that was described above.

In FIG. 1, the auxiliary battery has been shown; however, it will be noted that this auxiliary battery B_aux is optional. Specifically, it will be seen that the system of the invention is able to operate without the presence of this auxiliary battery.

The system comprises processing and control means UC that are tasked with:
  monitoring the state of charge of each main battery B_1, B_2, B_3 and of the auxiliary battery (if present);
  monitoring the current and voltage delivered by each main battery B_1, B_2, B_3 to its respective piece of consuming equipment E_1, E_2, E_3 and the current and voltage delivered by the auxiliary battery B_aux (if present);
  selecting a standby battery from the main batteries B_1, B_2, B_3 and the auxiliary battery B_aux if present; if an auxiliary battery is present, the processing and control means UC may select by default the auxiliary battery B_aux as standby battery;
  determining an operating configuration from a plurality of operating configurations;
  controlling switching means suitable for achieving a connection configuration of the selected standby battery depending on the determined operating configuration.

The processing and control means UC are configured to select a standby battery B_S from the batteries of the system. To select the standby battery, the processing and control means UC take into account:
  the presence/absence of an auxiliary battery B_aux in/from the system;
  the operating state of each main battery, i.e. whether the main battery is in an active state, i.e. supplying power to its piece of consuming equipment, or in its secondary state.

If an auxiliary battery is present and the latter has a sufficiently high state of charge, the processing and control means UC select this auxiliary battery as standby battery.

If the auxiliary battery is not present or its state of charge is insufficient, the processing and control means are tasked with selecting a main battery as standby battery B_S.

The main battery selected by the processing and control means as standby battery is a battery that is in a secondary state, i.e. stopped and the output current of which is zero.

The processing and control means UC store in memory an identifier of the battery selected as standby battery B_S.

Generally, it is possible to distinguish between a plurality of operating configurations of the system:
  a first configuration in which the selected standby battery B_S is used to provide assistance to one of the main batteries;
  a second configuration in which the selected standby battery B_S is used to charge at least one main battery.

It will be noted that a transfer of energy from one battery to another generates losses: losses during the transfer of energy, then losses on supply of power to the piece of equipment. Conversely, assistance in contrast allows losses to be decreased: no transfer of energy from one battery to another (no transfer losses), and supply of power to the piece of equipment by two sources that split the current. Specifically, the current from each battery is lower and the losses are therefore also lower. The losses may be divided by two if the two batteries are identical and solicited identically.

To implement the various operating configurations, a plurality of connection configurations may be commanded by the processing and control means UC.

To determine the connection configuration and therefore the operating configuration, the processing and control means UC take stock of the state of charge of each main battery and of the state of charge of the auxiliary battery B_aux of the system, if the latter battery is present.

The processing and control means UC determine the state of charge of each main battery and the state of charge of the auxiliary battery, if present, and are tasked with monitoring these parameters.

As indicated above, the processing and control means UC may choose various processing modes:

- a first processing mode in which, during its use, the actual state of charge (SOC_R) of each main battery is kept at a theoretical state of charge (SOC_TH) that is determined depending on the life cycle thereof;
- a second processing mode in which the state of charge of each main battery is kept above a threshold value;
- a third processing mode in which the processing and control means UC are configured to monitor the power level required by each piece of consuming equipment. The standby battery is called upon to supplement a main battery with a view to being able to deliver the power required by its piece of consuming equipment, whatever the state of charge of the main battery concerned by this supply of power to the piece of consuming equipment (i.e. even if this state of charge is above its theoretical state of charge SOC_TH or above a threshold value).

These processing modes are cumulative and the processing and control means UC are configured to execute at least one of these processing modes.

The theoretical state of charge SOC_TH may be determined by the processing and control means UC and corresponds to the state of charge in which the battery should be if it is used in the current operating regime. This theoretical state of charge follows a given decreasing curve as a function of time. It may be recomputed at any time if the operating regime of the battery is modified. This theoretical state of charge may notably be determined taking into account, for example, the state of health (SOH) of the battery, its temperature, the level of current that it is able to deliver, and the estimated future consumption profile.

In the first processing mode, the processing and control means UC connect the selected standby battery B_S to the main battery in the process of being used, with a view to providing assistance to the latter in the supply of power to its piece of consuming equipment and to ensuring that its actual state of charge SOC_R follows a theoretical state of charge SOC_TH.

In the second processing mode, the processing and control means UC disconnect, from its piece of consuming equipment, the main battery, the state of charge of which has passed below the threshold value, and connects said main battery to the selected standby battery B_S with a view to recharging same. In this operating mode, the piece of consuming equipment is consuming too much electrical power, and the combination of the main battery and of the standby battery is unable to supply the piece of consuming equipment with power while following the theoretical variation in state of charge.

Figure 6A:
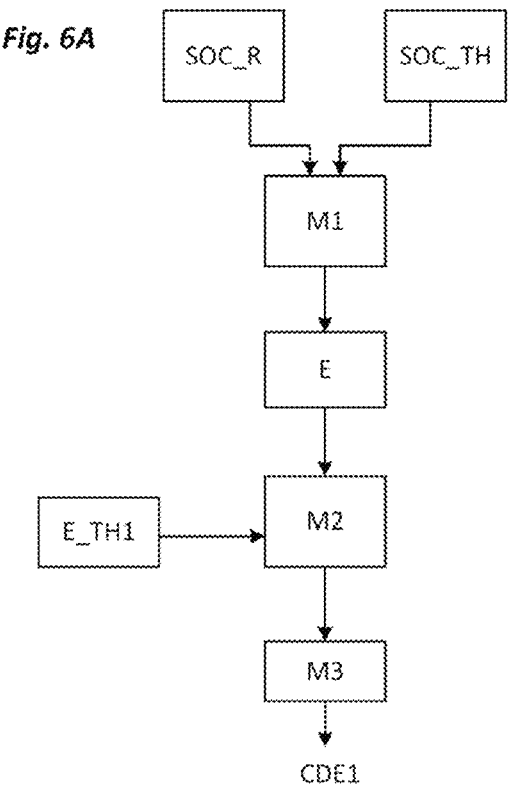
FIG. 6A, FIG. 6B and FIG. 6C show three algorithms executable by the processing and control means of the system of the invention.

Nonlimitingly, with reference to FIG. 6A, the processing and control means UC may comprise a determining software module M1 configured to determine the difference E between the actual state of charge SOC_R acquired beforehand and the computed theoretical state of charge SOC_TH, and a module M2 for comparing this difference E with a first threshold difference E_TH1. When the determined difference exceeds the first threshold difference, the processing and control means UC are configured to activate a control module M3 tasked with sending commands CDE1 corresponding to the implementation of the first operating mode. In other words, when the state of charge of the main battery departs excessively from the theoretical state of charge, the processing and control means UC activate a recharge of the main battery using the standby battery, in order to provide assistance to the main battery in the supply of power to its piece of consuming equipment.

Figure 6B:
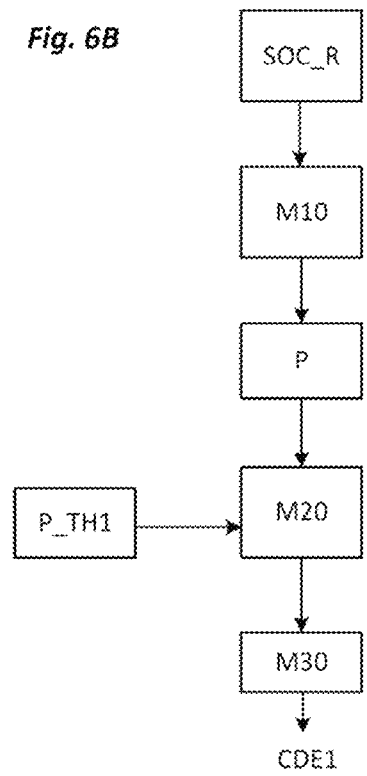

As a variant embodiment or in addition, the processing and control means UC may take stock of the slope of variation in the state of charge of the main battery and of a comparison of this slope with a first threshold slope. This principle is shown in FIG. 6B, in which is shown a module M10 for determining the slope P of variation in the actual state of charge of the main battery, a module M2 for comparing this slope P with a first threshold slope P_TH1, and a control module M30 configured to send the commands CDE1 when the slope exceeds the threshold slope. The theoretical threshold slope may be updated during operation, for example with a view to targeting a synchronized end of discharge of all the main batteries and thus take full advantage of the capacity of each thereof (i.e. avoid the situation in which one main battery reaches the end of discharge before the others and limits the range or the functionalities of the system while the other main batteries still have energy left).

Moreover, in one complementary embodiment, the processing and control means UC may also activate the second processing mode, for example when:

- the determined difference is larger than a second threshold difference (larger than the first threshold difference), and/or
- when the slope of variation in the state of charge is higher than a second threshold slope, in other words when the state of charge of the main battery drops too abruptly.

The two algorithms of FIGS. 6A and 6B remain valid in this complementary embodiment, the output control signal being determined so as to activate the second operating mode.

FIG. 4 shows a first graph D1 illustrating the variation in the actual state of charge of a main battery during its use, in comparison with the theoretical variation in its state of charge for this use.

FIG. 4 shows a second graph D2 illustrating the standby battery B_S providing charge in order to keep the actual state of charge SOC_R of the main battery (here the battery B_1) in phase with its theoretical state of charge SOC_TH. In this second graph, the standby battery is connected to this main battery at T3 and at T7, in order to provide it with assistance in the supply of power to the load, and optionally to slightly recharge it, and thus allow its actual state of charge to be realigned with its theoretical state of charge.

Figure 5:
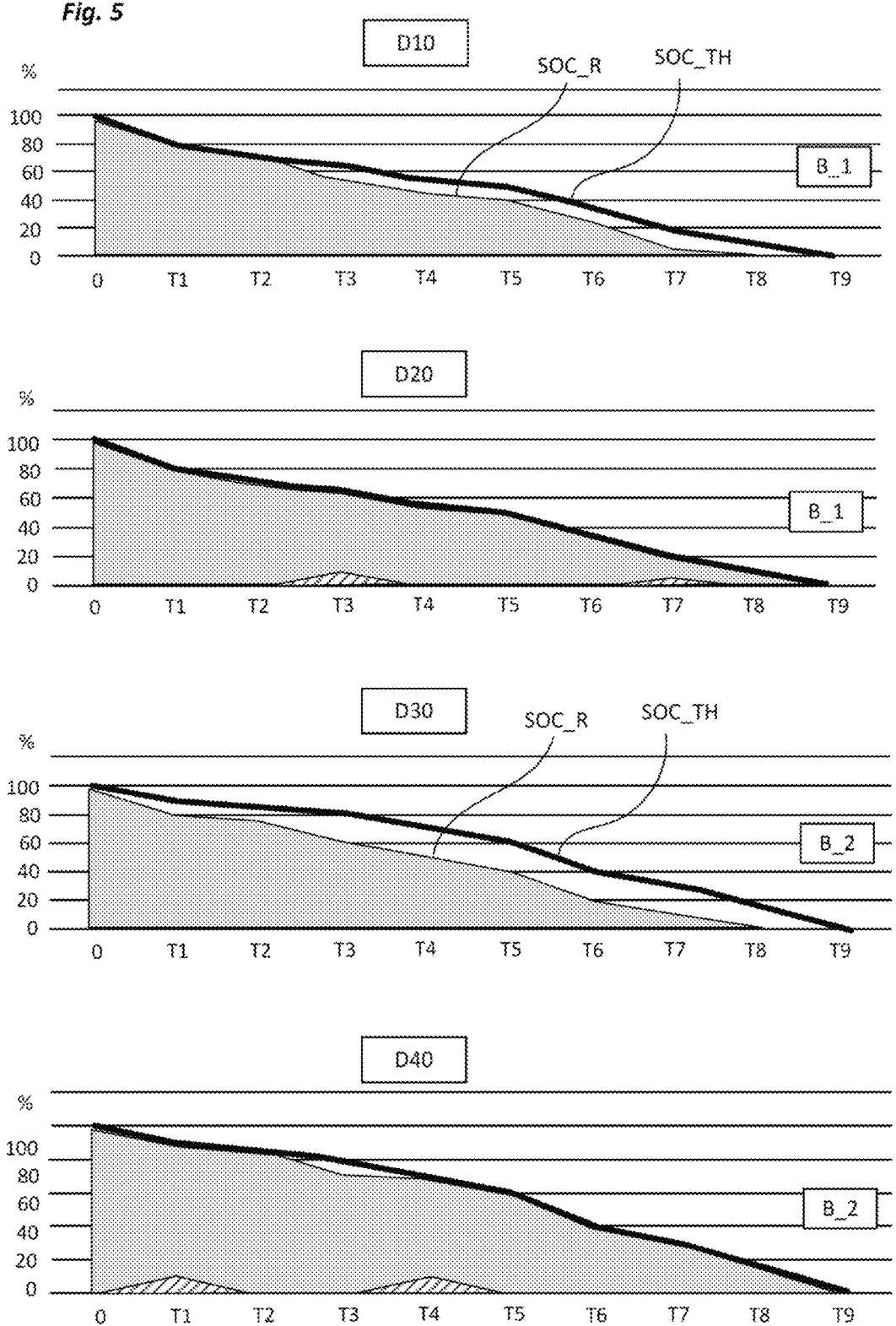

FIG. 5 shows four graphs illustrating the principle of the invention in respect of assistance of two main batteries.

Figure 3A:
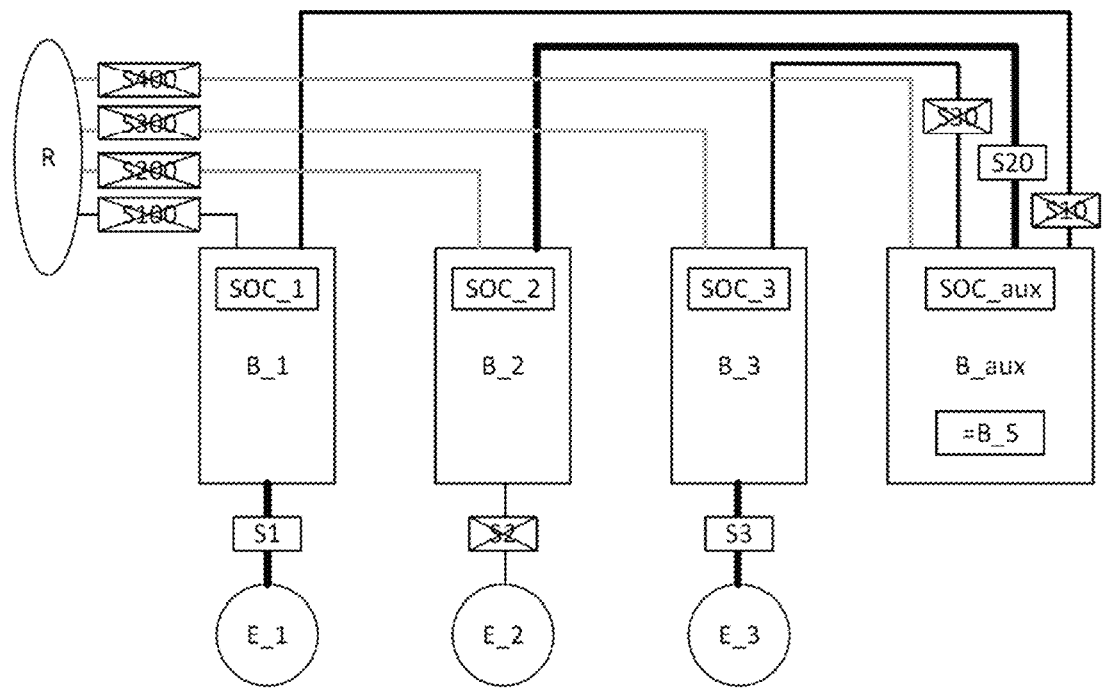
FIG. 3A, FIG. 3B, FIG. 3C and FIG. 3D show four cases of operation of the electrical power-supply system of the invention.

The first two graphs D10, D20 are identical those of FIG. 3A and illustrate the assistance provided by the standby battery to a first main battery. The other two graphs D30, D40 illustrate the assistance provided by the standby battery to a second main battery of the pack. As the standby battery cannot provide assistance to two main batteries simultaneously, the processing and control means determine which main battery must be provided with assistance first, as a priority. At the time T3, both main batteries must be provided with assistance. At the time T3, the processing and control means thus command, as a priority, connection of the standby battery B_S to the first main battery B_1, then, after disconnection, subsequently connect the standby battery B_S to the second main battery B_2 at the time T4.

To establish the priority, the processing and control means UC may take stock of the slope of variation in the actual state of charge of the main battery with respect to the theoretical state of charge. The main battery the actual state of charge of which differs most from its theoretical state of charge is assisted as a priority. Of course, other rules could be applied.

Figure 6C:
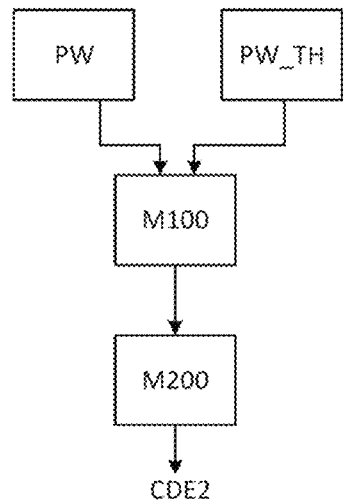

With reference to FIG. 6C, in the third processing mode, which allows the standby battery B_S to provide assistance to a main battery with a view to riding out a peak in power, the processing and control means UC define a power threshold PW_TH from which a main battery requires assistance. This power threshold PW_TH may be determined by the processing and control means UC depending on the characteristics of the main battery and on its current state (state of charge, temperature, state of health, internal impedance). The processing and control means UC comprise a module for acquiring the output power delivered by each main battery. They comprise a module M100 for monitoring the delivered output power PW and for comparing this power with the threshold value PW_TH. When the power PW demanded by the piece of consuming equipment of the main battery exceeds this power threshold PW_TH, the processing and control means UC activate a control module M200 that is configured to send commands CDE2 to the switching means of the system so as to cause a connection of the standby battery B_S to supplement the main battery to which assistance is to be provided with a view to riding out the peak in power.

Taking into account the state of charge of each main battery, the state of charge of the auxiliary battery B_aux (if present), and the chosen processing mode, the processing and control means UC determine a suitable connection configuration of the system, by selectively controlling various switching means.

The system may thus comprise:
first switching means arranged to connect or disconnect each main battery B_1, B_2, B_3 to/from the piece of consuming equipment with which it is associated;
second switching means arranged to connect or disconnect each main battery to/from each other main battery of the pack.

The system may also comprise third switching means arranged to connect or disconnect each main battery B_1, B_2, B_3 and the auxiliary battery B_aux to/from an electrical power grid R, allowing them to be recharged.

The system may also comprise fourth switching means arranged to connect or disconnect the auxiliary battery B_aux (if present) to/from each main battery B_1, B_2, B_3.

As regards the first main battery B_1, the first switching means comprise switches S1 tasked with connecting or disconnecting the first main battery to/from its piece of consuming equipment E_1.

As regards the second main battery B_2, the first switching means comprise switches S2 tasked with connecting or disconnecting the second main battery to/from its piece of consuming equipment E_2.

As regards the third main battery B_3, the first switching means comprise switches S3 tasked with connecting or disconnecting the third main battery to/from its piece of consuming equipment E_3.

The second switching means comprise switches S12, S13, S23 tasked with controlling the connection or disconnection of the first battery B_1 to/from the second battery B_2, of the first battery B_1 to/from the third battery B_3 and of the second battery B_2 to/from the third battery B_3, respectively.

The third switching means comprise switches S100, S200, S300 tasked with controlling the connection or disconnection of the first main battery B_1, of the secondary main battery B_2 and of the third main battery B_3 to/from the electrical grid R, respectively, and switches S400 tasked with controlling the connection or disconnection of the auxiliary battery B_aux to/from the electrical grid R.

The fourth switching means comprise switches S10, S20, S30 tasked with controlling the connection or disconnection of the first main battery B_1, of the second main battery B_2 and of the third main battery B_3 to/from the auxiliary battery B_aux, respectively.

The switches may be formed from electromechanical contactors that are able to be controlled open or closed or even from static relays (based on semiconductor switches).

Nonlimitingly, the system is considered to be three-phase, the aforementioned switches S1, S2, S3, S12, S13, S23, S10, S20, S30, S100, S200, S300, S400 each then comprise at least two switches.

Figure 2:
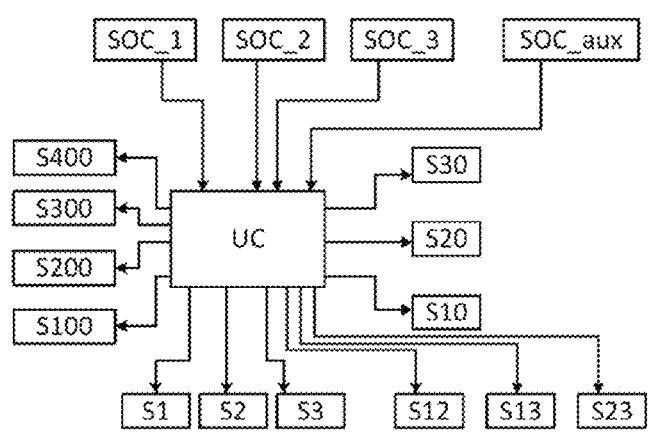
FIG. 2 shows a schematic illustrating the operating principle of the invention.

With reference to FIG. 2, the processing and control means UC are configured to control the first switching means, the second switching means, the third switching means and the fourth switching means, to reflect the applied processing mode. In FIGS. 1 and 2, the fourth switching means have been shown, but they are to be considered as optional if the auxiliary battery B_aux is absent from the system.

By way of example, various connection configurations are described below with reference to FIGS. 3A to 3C.

In FIG. 3A, the auxiliary battery is present and has been selected as standby battery (=B_S).

With reference to FIG. 3A, a first connection configuration for example consists in:
Controlling closed the switches S1 and S3 to connect the first main battery B_1 to the first piece of consuming equipment E_1 and the third main battery B_3 to the third piece of consuming equipment E_3, respectively.
Controlling open the switches S2 to disconnect the second main battery B_2 from the second piece of consuming equipment E_2.
Controlling closed the switches S20 to connect the auxiliary battery, which has been selected as standby battery B_S, to the second main battery B_2 with a view to charging the latter.
The switches S10, S30 and S100, S200, S300 and S400 are controlled open.

Figure 3B:
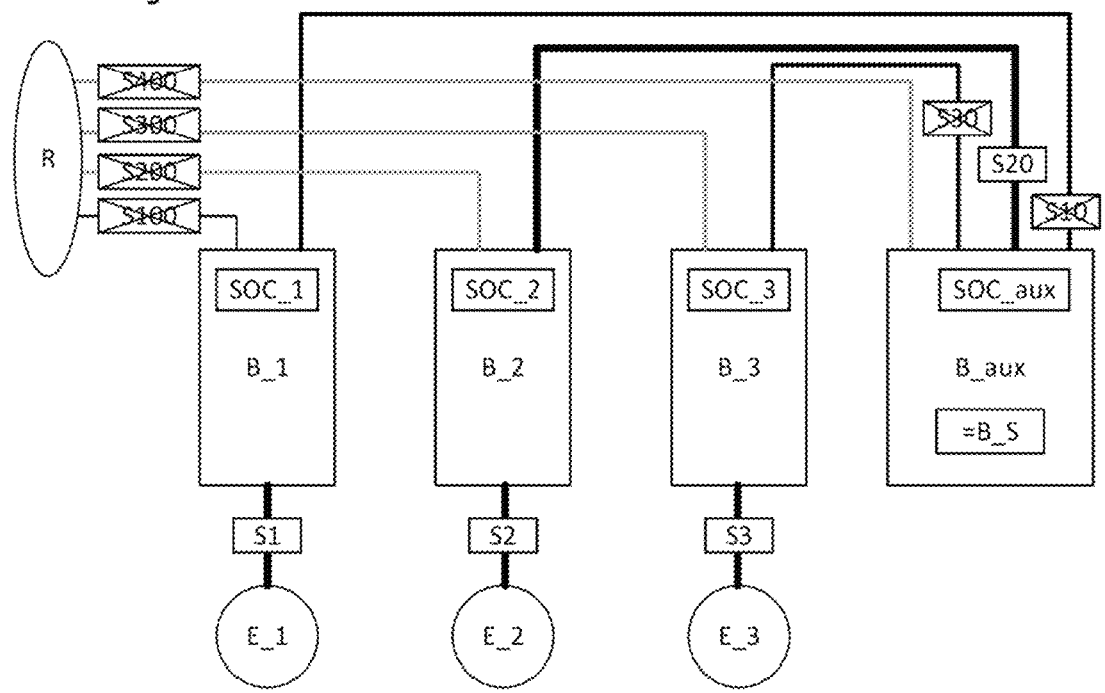

In FIG. 3B, the auxiliary battery B_aux is present and has been selected as standby battery (=B_S).

With reference to FIG. 3B, a second connection configuration for example consists in:
Controlling closed the switches S1 and S3 to connect the first main battery B_1 to the first piece of consuming equipment E_1 and the third main battery B_3 to the third piece of consuming equipment E_3, respectively.
Controlling closed the switches S2 to connect the second main battery B_2 to the second piece of consuming equipment E_2.
Controlling closed the switches S20 to connect the auxiliary battery, which has been selected as standby battery B_S, to the second main battery B_2, so as to provide assistance to the second main battery B_2 in the supply of power to the second piece of consuming equipment E_2.

The switches S10, S30 and S100, S200, S300 and S400 are controlled open.

Figure 3C:
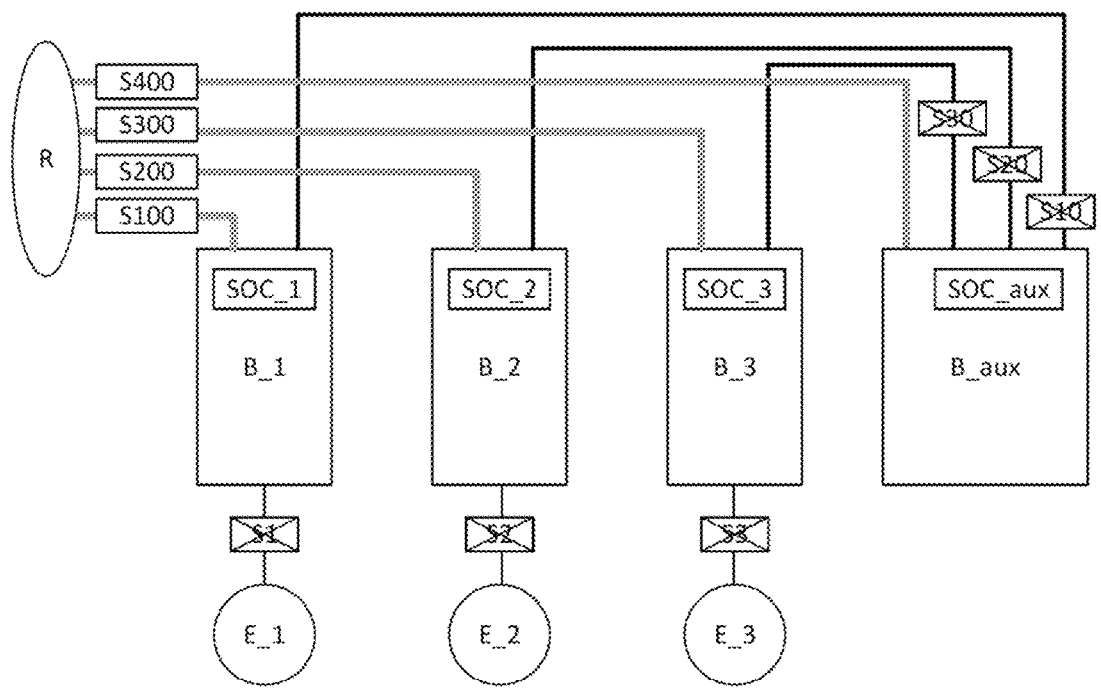

In FIG. 3C, the main batteries are being recharged from the grid R.

With reference to FIG. 3C, a third connection configuration for example consists in:

Controlling closed the switches S100, S200, S300 and S400 to connect the first main battery B_1, the second main battery B_2, the third main battery B_3, and the auxiliary battery B_aux, respectively, to the electrical grid R, with a view to recharging them.

Controlling open the switches S1, S2, S3 to disconnect the first main battery B_1 from the first piece of consuming equipment E_1, the second main battery B_2 from the second piece of consuming equipment E_2, and the third battery B_3 from the third piece of consuming equipment E_3, respectively.

Controlling open the switches S10, S20, S30 to disconnect the auxiliary battery B_aux from the first main battery B_1, from the second main battery B_2, and from the third main battery B_3, respectively.

Figure 3D:
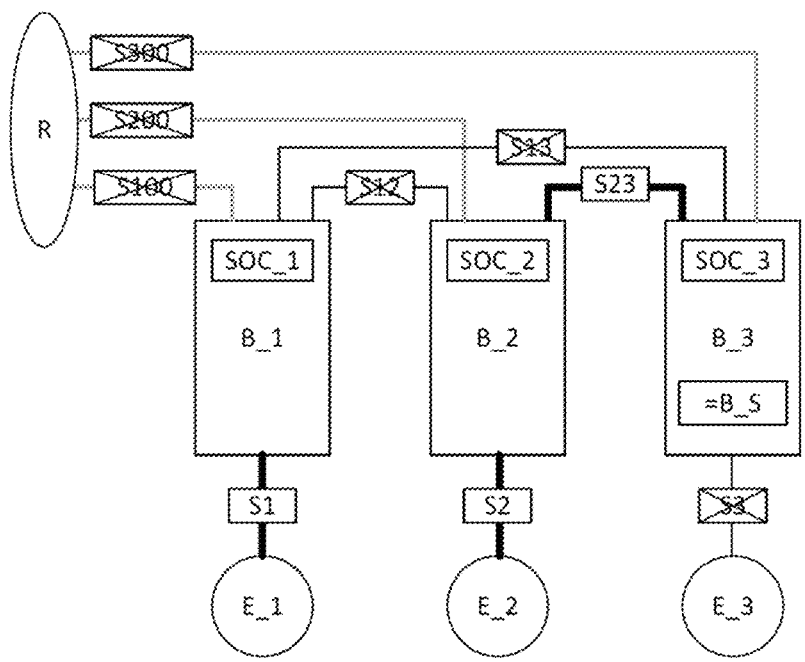

In FIG. 3D, the auxiliary battery B_aux is absent from the system. The processing and control means UC are thus configured to select a standby battery B_S from the main batteries present and in a secondary state (stopped). In this FIG. 3D, the battery B_3 has been selected as standby battery B_S. The determined operating configuration requires the standby battery to provide assistance to the battery B_2.

With reference to FIG. 3D, a fourth connection configuration for example consists in:

Controlling closed the switches S1 and S2 to connect the first main battery B_1 to the first piece of consuming equipment E_1 and the second main battery B_2 to the second piece of consuming equipment E_2, respectively.

Controlling open the switches S3 to disconnect the third main battery B_3 from the third piece of consuming equipment E_3.

Controlling closed the switches S23 to connect the selected standby battery B_S to the second main battery B_2, so as to provide assistance to the second main battery B_2 in the supply of power to the second piece of consuming equipment E_2.

The switches S10, S30 and S100, S200, S300 are controlled open.

Of course, other connection configurations could be envisioned and these configurations have been given by way of example, certain of those described above being adaptable to a system devoid of the auxiliary battery B_aux.

The invention thus has many advantages, among which:

it allows a plurality of pieces of consuming equipment to be supplied with power without over-dimensioning the batteries that are used;

it allows a high degree of modularity in the management of the batteries; it is simple to implement and works based on parameters that are already available, such as the state of charge of the batteries;

it allows switched-cell batteries to be used, while preserving the advantages of a conventional shared-bus solution.

The invention claimed is:

1. An electrical power-supply system, comprising:
a plurality of electrical batteries, each battery comprising a plurality of cells connected in series and/or parallel, and separate switches attached to each cell or to a group of the plurality of cells, the plurality of electrical batteries comprising main batteries, which are each dedicated to delivering electrical power to a corresponding piece of consuming equipment; and
processing and control circuitry configured to
select a standby battery from the plurality of electrical batteries, the selected standby battery being a battery having an output current of zero;
determine an operating configuration as a first configuration in which the selected standby battery provides assistance to one of the main batteries, or a second configuration in which the selected standby battery charges at least one main battery; and
achieve a connection configuration of the selected standby battery to the main battery depending on the determined operating configuration,
wherein, for each main battery, the processing and control circuitry is further configured to
acquire an actual state of charge of the main battery,
determine a difference between the acquired actual state of charge and a theoretical state of charge and/or a slope of variation in the acquired actual state of charge,
compare the determined difference with a first threshold difference and/or compare the slope of variation with a first threshold slope, and
when the determined difference exceeds the first threshold difference and/or when the determined slope exceeds the first threshold slope, activate a provision of assistance to the main battery using the selected standby battery while keeping the main battery connected to the corresponding piece of consuming equipment,
wherein the processing and control circuitry is further configured to
keep the actual state of charge of each main battery at the theoretical state of charge that is determined depending on a life cycle thereof;
keep the actual state of charge of each main battery above a threshold value; or
monitor a power level required by each piece of consuming equipment with respect to a threshold power level.

2. The system according to claim 1, further comprising a first plurality of switches arranged to control a connection or a disconnection of each main battery to/from the corresponding piece of consuming equipment.

3. The system according to claim 1, further comprising a second plurality of switches arranged to control a connection or a disconnection of each main battery to/from each other main battery.

4. The system according to claim 1, further comprising a third plurality of switches that is controllable by the processing and control circuitry and that is arranged to control a connection or a disconnection of each battery to/from an electrical power grid.

5. The system according to claim 1, wherein the plurality of electrical batteries comprise an auxiliary battery that is not associated with a piece of the consuming equipment.

6. The system according to claim 5, further comprising a fourth plurality of switches that is controllable by the processing and control circuitry and that is arranged to control a connection or a disconnection of the auxiliary battery to/from each main battery.

7. The system according to claim 1, wherein, for each main battery, the processing and control circuitry is further configured to:
  compare the difference with a second threshold difference higher than the first threshold difference, and/or compare the slope of variation with a second threshold slope higher than the first threshold slope, and
  when the determined difference exceeds the second threshold difference and/or when the determined slope exceeds the second threshold slope, activate a disconnection of the main battery from the corresponding piece of consuming equipment and activate a connection to recharge the main battery to the selected standby battery or to an electrical grid.

8. The system according to claim 7, wherein, applied to each main battery, the processing and control circuitry is further configured to:
  acquire the electrical power delivered by each main battery to the corresponding piece of consuming equipment,
  compare the power delivered by each battery with a threshold value, and
  when the power delivered by each main battery exceeds the threshold value, activate a provision of assistance to the main battery using the standby battery.

9. The system according to claim 1, wherein the plurality of electrical batteries each comprise the plurality of cells connected in series and/or parallel, each cell comprising one of the switches.

10. A hybrid or electric vehicle including the electrical power-supply system defined in claim 1, the electric power-supply system supplying power to electric motors located on-board the hybrid or electric vehicle.

11. A control method implemented in an electrical power-supply system including a plurality of electrical batteries, each battery comprising a plurality of cells connected in series and/or parallel, and separate switches attached to each cell or to a group of the plurality of cells, the plurality of electrical batteries comprising main batteries, which are each dedicated to delivering electrical power to a corresponding piece of consuming equipment, the method comprising, for each main battery:
  acquiring the actual state of charge of the main battery,
  determining the difference between the acquired actual state of charge and the theoretical state of charge and/or the slope of variation in the acquired actual state of charge,
  comparing the difference with the first threshold difference and/or of the slope of variation with the first threshold slope, and
  when the determined difference exceeds the first threshold difference and/or when the determined slope exceeds the first threshold slope, generating a command to perform a recharge of the main battery using a selected standby battery of the plurality of electrical batteries, while keeping the main battery connected to the corresponding piece of consuming equipment,
  wherein the method further comprises
    keeping the actual state of charge of each main battery at the theoretical state of charge that is determined depending on a life cycle thereof,
    keeping the actual state of charge of each main battery above a threshold value, or
    monitoring a power level required by each piece of consuming equipment with respect to a threshold power level.

12. The method according to claim 11, further comprising:
  performing a second comparison of the difference with a second threshold difference higher than the first threshold difference, and/or of the slope of variation with a second threshold slope higher than the first threshold slope, and
  when the determined difference exceeds the second threshold difference and/or when the determined slope exceeds the second threshold slope, generating a command to perform disconnection of the main battery from the corresponding piece of consuming equipment and a connection, to recharge the main battery to the selected standby battery or to an electrical grid.

13. The method according to claim 12, further comprising:
  acquiring the electrical power delivered by each main battery to the corresponding piece of consuming equipment,
  performing comparison of the power delivered by each main battery with a threshold value, and
  when said power delivered by each main battery exceeds the threshold value, activating a provision of assistance to the main battery using the selected standby battery.

14. An electrical power-supply system, comprising:
  a plurality of electrical batteries, each battery comprising a plurality of cells connected in series and/or parallel, and separate switches attached to each cell or to a group of the plurality of cells, the plurality of electrical batteries comprising main batteries, which are each dedicated to delivering electrical power to a corresponding piece of consuming equipment; and
  processing and control circuitry configured to
    select a standby battery from the plurality of electrical batteries, the selected standby battery being a battery having an output current of zero;
    determine an operating configuration as a first configuration in which the selected standby battery provides assistance to one of the main batteries, or a second configuration in which the selected standby battery charges at least one main battery; and
    achieve a connection configuration of the selected standby battery to the main battery depending on the determined operating configuration,
  wherein, for each main battery, the processing and control circuitry is further configured to
    acquire an actual state of charge of the main battery,
    determine a difference between the acquired actual state of charge and a theoretical state of charge and/or a slope of variation in the acquired actual state of charge,
    compare the determined difference with a first threshold difference and/or compare the slope of variation with a first threshold slope, and
    when the determined difference exceeds the first threshold difference and/or when the determined slope exceeds the first threshold slope, activate a provision of assistance to the main battery using the selected standby battery while keeping the main battery connected to the corresponding piece of consuming equipment,
  wherein, for each main battery, the processing and control circuitry is further configured to
    compare the difference with a second threshold difference higher than the first threshold difference, and/or compare the slope of variation with a second threshold slope higher than the first threshold slope, and when the determined difference exceeds the second threshold difference and/or when the determined slope exceeds the second threshold slope, activate a disconnection of the main battery from the corresponding piece of consuming equipment and activate a connection to recharge the main battery to the selected standby battery or to an electrical grid.

\* \* \* \* \*